United States Patent [19]
Loebig

[11] Patent Number: 5,513,312
[45] Date of Patent: Apr. 30, 1996

[54] METHOD FOR SYSTEM-PROMPTED FAULT CLEARANCE OF EQUIPMENT IN COMMUNCATION SYSTEMS

[75] Inventor: Norbert Loebig, Darmstadt, Germany

[73] Assignee: Siemens Aktiengesellschaft, Munich, Germany

[21] Appl. No.: 166,691

[22] Filed: Dec. 15, 1993

[30] Foreign Application Priority Data

Dec. 15, 1992 [DE] Germany .................. 42 42 323.6

[51] Int. Cl.$^6$ .............................................. H04B 17/00
[52] U.S. Cl. ............................................... 395/182.01
[58] Field of Search ............. 371/29.1; 364/927.66, 364/919, 921.8, 281.9, 276.3, 286.1, 264.5, 268.3, 550, 551.01, 448, 474.16, 474.19; 395/184.01, 185.01, 182.01

[56] References Cited

U.S. PATENT DOCUMENTS

| | | | |
|---|---|---|---|
| 4,626,996 | 12/1986 | Arlott ................................ | 364/424 |
| 4,634,110 | 1/1987 | Julich et al. ...................... | 371/11 |
| 4,658,359 | 4/1987 | Palatucci et al. ................. | 364/424 |
| 4,872,121 | 10/1989 | Chan et al. ........................ | 364/551.01 |
| 4,943,919 | 7/1990 | Aslin et al. ....................... | 364/424.03 |
| 4,965,879 | 10/1990 | Fischer, Jr. ....................... | 364/424.01 |
| 5,051,895 | 9/1991 | Rogers ............................... | 364/200 |
| 5,132,920 | 7/1992 | Bellows et al. .................... | 364/551.01 |
| 5,200,958 | 4/1993 | Hamilton et al. ................. | 371/16.4 |
| 5,239,547 | 8/1993 | Tomiyama et al. ............... | 371/16.4 |
| 5,251,302 | 10/1993 | Weigl et al. ...................... | 395/250 |
| 5,299,207 | 3/1994 | Fujii .................................. | 371/29.1 |

FOREIGN PATENT DOCUMENTS

| | | | |
|---|---|---|---|
| 0383291 | 8/1990 | European Pat. Off. | ........ H04B 17/00 |
| 2237167 | 4/1991 | United Kingdom | ............ H04L 12/40 |

OTHER PUBLICATIONS

Article entitled "Operations Technology Generic Requirements: (OTGR) Network Element", Bellcore, Technical Reference TR-TSY-000474, Issue 3, Nov. 1989, pp. 4-24-4-33.

Primary Examiner—Robert W. Beausoliel, Jr.
Assistant Examiner—Stephen C. Elmore
Attorney, Agent, or Firm—Hill, Steadman & Simpson

[57] ABSTRACT

Contemporary communication systems must have extremely high availability and malfunctioning equipment must be repaired and replaced as quickly as possible. To this end, optical displays are provided for all equipment. An optical display is driven in case of malfunction as a function of the results provided by a fault procedure, whereby the drive of the optical display displays current information indicating the permissibility and necessity of equipment replacement. The advantages of this procedure are fast repair of the fault and enhanced availability of the communication system.

18 Claims, 2 Drawing Sheets

METHOD FOR SYSTEM-PROMPTED FAULT CLEARANCE OF EQUIPMENT IN COMMUNCATION SYSTEMS

BACKGROUND OF THE INVENTION

The present invention is directed to a method for system-prompted fault clearance of equipment in communication systems.

Offering new performance features and services has lead to an increase in the degree of complexity of contemporary communication systems. This means that a communication system is constructed of a plurality of equipment including procedures which control the equipment which, in interaction with one another, effect the control of the communication flow and of the respectively requested services. Such equipment is usually composed of a plurality of assemblies which are structurally accommodated in closed cabinets for technical reasons (shielding against electromagnetic inputs and emission, elimination of dissipated power, etc.).

In general, different demands are made of communication systems than of other technical systems and installations such as, for example, data processing systems. Thus, a communication system must be available for all subscribers at all times within the framework of its capacities. For this reason, the assemblies of a communication system are redundantly designed with a large fault penetration range. Given outage of an assembly, for example, this means that a switch can be made to an assembly or equipment that is redundantly designed. A redundant assembly or equipment can be placed in operation and the malfunctioning assembly can be taken out of operation as part of a pool of active assemblies without limitation of service. Alternately, the failed functions of the malfunctioning assemblies are switched to a plurality of other assemblies. The assembly at which the malfunction has occurred must then be changed and replaced according to the manufacturer's particulars (for example, within three hours dispatch plus repair according to BELLCORE demands) in order to maintain the availability of the communication system required by the operator and guaranteed by the manufacturer. International standards authorities for communication systems/communication networks (for example, CCITT) require an extremely high availability of the system over the entire useful life thereof.

This is defined in the form of a multitude of reliability parameters and appertaining allowable limit values (for example, complete or partial non-availability of the system, non-availability for subscriber lines and trunk lines, error rates for unsuccessful seizure attempts, cleared down/ aborted connections, incorrect charges). In particular, a communication system is allowed to be totally down for at most one hour over a time span of 20 years (this usually represents a typical useful life of a communication system), BELLCORE demand, three minutes per year, TRMSY/ 000512. Corresponding to such reliability demands, the components of a communication system are generally redundantly executed 1:1 or at least m:n.

In order to meet these demands, internal procedures and assemblies of the system must be monitored and faults that potentially occur must be recognized early and eliminated. Thus, the faults occurring at the respective assemblies must be recognized, registered, evaluated in terms of their urgency and an alarm to the operator for the purpose of eliminating the fault must be started dependent on this evaluation. To this end, fault treatment procedures as well as diagnostic procedures are implemented in the central control means in contemporary communication systems. The fault treatment procedures are thereby present in "memory-resident" fashion in order to be able to handle the appearance of faults in the system without time delay. The appearance of a fault is recognized on the basis of continuous monitoring, monitoring given activity or access as well as on the basis of a cyclical routing test of the hardware. Further, the appearance of a fault on an assembly can be recognized within the framework of a cyclical test of the internal communication paths of the system that is started by the fault treatment procedures, in that messages are sent to the respective assemblies in a cyclical time grid and the reaction of the assemblies to these messages is checked. Otherwise, the fault treatment procedures react to error messages that are sent by the assemblies themselves to the central control means in case of error. Its job is also to localize the errors that have occurred as quickly as possible to assembly parts of specific assemblies, to individual assemblies or at least to an entity of assemblies composed of few assemblies. Subsequently, an error message is sent to an operator interface for the purpose of triggering an alarm. In response thereto, the operating personnel activates diagnostic procedures potentially stored in the central control means, insofar as this is necessary for a more precise localization of the fault on the assembly level or is prescribed by the manufacturer or operator for verification of the fault. A more exact analysis as well as a more exact isolation of the error that has occurred is possible with the assistance of these diagnostic procedures, since these can test assemblies or equipment in a more comprehensive manner on the basis of fault detection that operates during ongoing operation. After recognition and evaluation of the fault, the higher-ranking equipment, the assembly or a part of the assembly as well as, potentially, the standby circuit of equipment, assembly or functions is placed out of service dependent on the quality of the fault localization achieved on the basis of the fault evaluation. When the localization of the error has occurred on the assembly level, the communication system can be repaired, whereby the malfunctioning assembly is removed in the simplest case and is replaced by a complete assembly. In view of simple fault clearance procedures based on structural precautions, the individual assemblies can be removed by being pulled from the module frame or can be plugged into the module frame without equipment assembly to a central or neighboring assembly. The fault clearance and elimination of the faults that have occurred in the communication system is described in view of the necessary steps in a maintenance handbook provided for this purpose. All steps necessary for the fault clearance of a fault that has occurred may be found here together with the steps potentially required for further fault localization or for preparation for an assembly replacement and job scheduling required after the completion thereof.

What is problematical about such a procedure, however, is that such a repair having fault verification, fault localizing and assembly replacement lasts too long and is susceptible to errors. Since the appertaining equipment assembly function was shut off in the malfunction case, this means in practice that equipment/assemblies having a high fault penetration range participate in the control and through connection of the communication flow in the communication system for the duration of the fault clearance without or with limited redundancy. For the duration of the fault clearance, however, this means that a further assembly to which standby switching can be potentially undertaken given the appearance of a further malfunction is generally no longer present in the appertaining sub-system. Dependent on the urgency and gravity of the fault that has occurred, this may involve the total outage of the entire communication system under certain circumstances. In order to speed up the time of fault clearance on the basis of simplified manipulation, optical display means are usually attached to a few assemblies of the communication system. It should thereby be taken into consideration, however, that the display devices are currently not uniformly employed either in number, color or significance in the communication system, which does not facilitating the clearance of a fault in practice. Further, the operator interface generally participates in the clearance of the fault in the prior art and usually means that an extensive system knowledge about structure and localization of the participating assemblies is required. Dependent on the nature and urgency of the fault that has occurred, many fault clearance steps may be required under certain circumstances and are incapable of being standardized due to the multitude and to the degree of complexity of the possible faults. Due to the high degree of integration of the assemblies for contemporary systems, it is meaningful in view of the fault tolerance of the system, the increased fault susceptibility of LSI assemblies, of the permissible maximum time for the fault clearance of the system and of the degree of redundancy to be offered for sub-systems to leave assemblies that partially malfunction in service. The fault clearance of partially malfunctioning assemblies, however, in turn requires increased activities of the operator at the operator interface of the system. Namely, assurance and verification of adequate redundancy before fault clearance, potentially the complete shut-down of the assembly ensuing softly (lockout of the switching technology) before fault clearance is required via an operator interface. This is because an assembly that is still partially in service can generally not be pulled without a loss of through-connected calls or without a deterioration of service.

In case of malfunctioning assemblies in remote units, the necessity can even occur under certain circumstances that the fault localization and performance of the prerequisites for replacing the assembly can only be implemented by supporting commands via the operator interface and the successive elimination of the fault can likewise only be seen at the operator interface. In practice this requires involved communication of the maintenance personnel at the site with the operating personnel at the operator interface. Given the complexity of the individual fault clearance step, there is also the possibility that incorrect assemblies will be mistakenly replaced due to faulty interpretations.

SUMMARY OF THE INVENTION

It is an object of the present invention to simplify the elimination and fault clearance of occurring faults in a communication system in a practical manner, to make the system more reliable and user-friendly and, thus, to speed up the elimination of faults, in order to thus reduce the total outage probability of the entire communication system and to achieve an enhancement of the availability.

In general terms the method of the present invention is a method for system-prompted fault clearance of equipment in a communication system. The communication system has a central control means in which sequence or execute at least one fault treatment procedure as well as at least one diagnostic procedure. The communication system also has hardware equipment, particularly assemblies each having a respective control means, a respective timer controlled by the control means as well as, potentially, a plurality of sub-modules located in the respective hardware equipment. The hardware equipment are driven by a fault treatment procedure or a diagnostic procedure sequencing in the central control means for the verification of their operating condition. Given appearance of a malfunction on at least one of the hardware equipment, the control means belonging thereto transmits a fault message to the central control means. The central control means then implements a fault verification/fault localization procedure and, first, updates a current fault picture of all hardware equipment present in the communication system that is stored in a fault table, updating this with the information thereby obtained, and, second, sends an alarm message to an operator. Using the information obtained, an evaluation procedure sequencing in the central control means identifies parameters of a maintenance handbook stored therein, particularly those that provide information about the current degree of redundancy of the malfunctioning hardware equipment, and are logically operated with the parameters representative of the current fault picture. Dependent on the result of the operation, a control procedure is initialized with which an optical display means is driven on the respective hardware equipment that indicates permissibility of an assembly replacement. After the replacement of the malfunctioning hardware equipment as well as after being automatically placed in service by the central control means, an automatic verification of freedom from malfunction is implemented and the updating of the optical display means is undertaken by the control procedure.

An advantage of the present invention is the drive of an optical display means at malfunctioning hardware equipment, whereby this drive has the significance of a permitted and required assembly replacement. The drive ensues via a control procedure sequencing in the central control means, this being activated by an evaluation procedure that links a plurality of parameters with one another. The maintenance personnel are thus informed what hardware equipment must be replaced for the elimination and fault clearance of the fault that has occurred. The optical display means indicates permissibility of an assembly replacement without consulting the maintenance handbook and without deploying activities at the operator interface. What is advantageous about this procedure is that the fault clearance of the fault that has occurred is speeded up. What is thus particularly achieved is that the total outage probability of a communication system during the elimination and fault clearance of the fault that has occurred is reduced.

In case of such a seriously occurring malfunction that no fault message can be communicated to the central control means from the respective control means, a timer in the hardware equipment automatically drives the optical display means when its time runs out. When, thus, an assembly is completely down and can no longer be addressed from the system side, then the hardware located on the assembly sees to it that the appertaining optical display means assumes the significance of a permissible assembly or element replacement. This has the advantage that the optical display means at the appertaining hardware equipment is correctly driven even given non-transmission of an error message to the central control means.

In case the fault verification implemented by the central control means shows that the respective hardware equipment is only partially malfunctioning, having at least one sub-module still operational, an alternate circuit on a corresponding sub-module of the respective hardware equipment is only implemented for the sub-modules that are in fact malfunctioning. The display means of the respective hardware equipment is driven dependent thereon that adequate redundancy is still present for the alternate circuit of the sub-modules that are fault-free and active and still situated on the malfunctioning assembly. When an assembly is only partially taken of service at the system side and an assembly replacement is possible without further activities at the operator interface due to the availability of redundancy and lack of reactions or acceptable reactions on the through-connection and activated services, then the optical display also assumes the significance of a permissible assembly replacement. This has the advantage that even partially malfunctioning assemblies remain conditionally functional up to the assembly replacement and can be quickly fault-cleared in a simple and reliable way, this further enhancing the system availability.

When a plurality of malfunctioning hardware equipment is to be replaced taking a fixed sequence into consideration, the respective optical display means of a hardware equipment to be subsequently replaced is only driven when all hardware equipment to be previously replaced has already been successfully replaced and has automatically been put back in service. When double or multiple fault situations exist, the sequence of the replacement of the assembly playing a part therein, then the optical display of the assembly which is to be respectively replaced first likewise assumes the significance of a permissible assembly replacement. This has the advantage that the replacement of the hardware equipment can be implemented in the proper sequence without complicated activities that are susceptible to errors on the part of the operator at the operator interface, the availability of the communication system being capable of being further improved therewith.

In another development of the present invention all direct outage and reavailability messages of the system are combined by a fault treatment procedure sequencing in the central control means to form an overall fault picture that is current at all times and that is weighted in view of procedures necessary for fault clearance according to the maintenance rules of the manufacturer. Utilized for this purpose are all results achieved by continuous monitoring, monitoring upon activation of access, cyclical verification of a recognized fault, cyclical routine tests of the hardware, monitoring of the pulling and plugging of an assembly, as well as cyclical testing of the internal system communication of the central control means with the assemblies. The result of the evaluation leads to the system-side updating of all optical display devices of the malfunctioning assemblies which can be addressed at the system side with respect to the permissibility and necessity of an assembly replacement. When a fault is eliminated by replacement of an assembly or when the fault condition ends without external action, due for instance to dynamic influences, then the assembly is placed back into operation and the optical display assumes the significance of an impermissibility assembly or element replacement.

In case of an imprecise error localizing by the fault treatment procedure, that a diagnostic procedure is started via the operator interface. This has the advantage that fault analysis as well as fault localization are possible to a far more precise extent via diagnostic procedures and, thus, the corresponding optical display means can be subsequently correctly driven. When the malfunctioning assembly or partially malfunctioning assembly was only capable of being identified from the as yet imprecise fault message of the system and only after a diagnosis manually started by the operator, then the optical display means likewise assumes the significance of a permissible assembly or element replacement after this diagnosis.

Given partially malfunctioning assemblies that are still in service (no redundancy being present for these and, consequently, certain operator activities such as reducing the traffic on the assembly are prescribed before assembly replacement), the drive of the optical display means for displaying the permissibility of the assembly replacement ensues only after the prescribed prerequisite effected via the operator interface has been met. This likewise has the advantage of even shorter and simpler repair actions without the necessity of communication between the operator and the maintenance personnel.

Furthermore, the drive of the optical display means can be canceled after elimination of the malfunction on the respective hardware equipment. This has the advantage that the successful fault clearance is thus directly visible on site.

Also, the system-prompted fault clearance formulated on the basis of the equipment can be analogously applied to individual, replaceable elements of equipment as well as to optical transmission systems between system components that are conducted within the switching/transmission equipment and that are realized in the form of assembly plugs. For this purpose, the optical display possibility is to be provided at the appertaining, replaceable assembly element or on the assembly plugs.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENT

Figure 1:
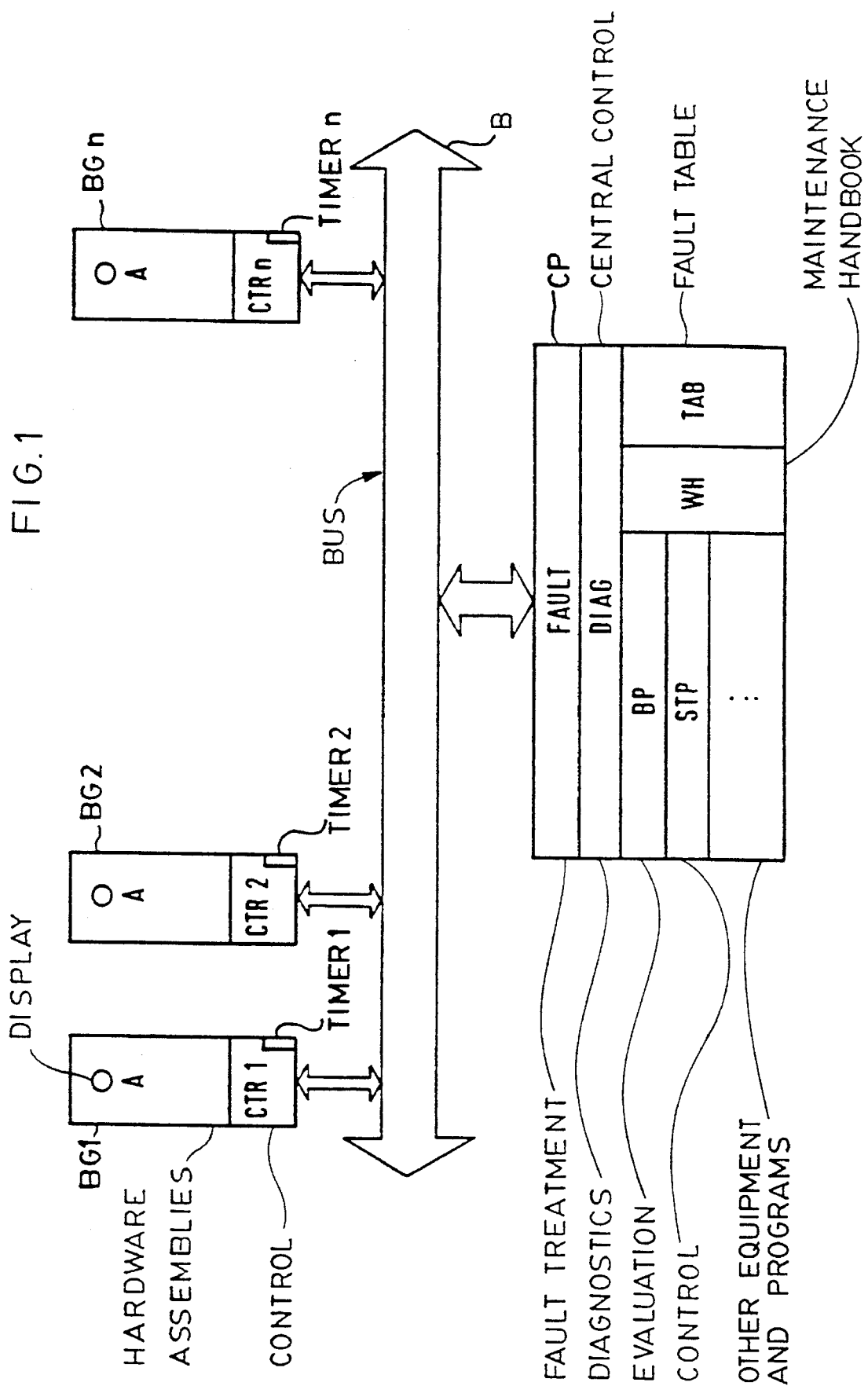
FIG. 1 is a block circuit diagram of the relevant parts of a communication system in which the method of the present invention is implemented.

FIG. 1 shows a bus system B that is shared by all equipment of a communication system and which can also be expanded by a system wide network of communication channels on an HDLC (High Level Data Link Central) or ATM (Asynchronous Transmission Mode) basis. First, hardware equipment, for example in the form of assemblies BG1 . . . BGn, and, second, a central control means CP are connected to the bus system B.

The assemblies BG1 . . . BGn are each respectively provided with an optical display means A1 . . . An. This is controlled by an assembly control means CTR1 . . . CTRn belonging to the respective assembly. Further, a timer TIMER1 . . . TIMERn is provided on every assembly. The assembly control means CTR1 . . . CTRn resets the respective timer TIMER1 . . . TIMERn in a cyclical time grid. Due to a serious malfunction that has occurred on one of the assemblies BG1 . . . BGn, an error message can potentially no longer be communicated in time from the assembly control means CTR1 . . . CTRn to the central control means CP.

As a rule, the assembly control means CTR1 . . . CTRn is defective due to such a serious malfunction. In this case, the respective timer TIMER1 . . . TIMERn runs out and is no longer reset by the appertaining assembly control means CTR1 . . . CTRn. Due to the runout of the timer, the optical display means A1 . . . An arranged on the respective assembly is automatically driven that is, activated. This indicates that the assembly is malfunctioning and can be replaced. These events are explained in the flowchart depicted in FIG. 2.

Within the framework, for example, of a cyclical routine test, the central control means CP recognizes that one or more assemblies BG1 . . . BGn exhibit malfunction. This occurs in that a fault treatment procedure FAULT sequencing in the central control means CP cyclically transmits a message to each of the assemblies BG1 . . . BGn. If there is no response from the assemblies BG1 through BGn within a defined time span, this is interpreted to mean a malfunction. A fault table TAB that is stored in the central control means CP and which has the current fault picture of all assemblies present in the communication system is updated, this being exclusively employed for the correct drive of the optical display means on the assemblies.

Figure 2:
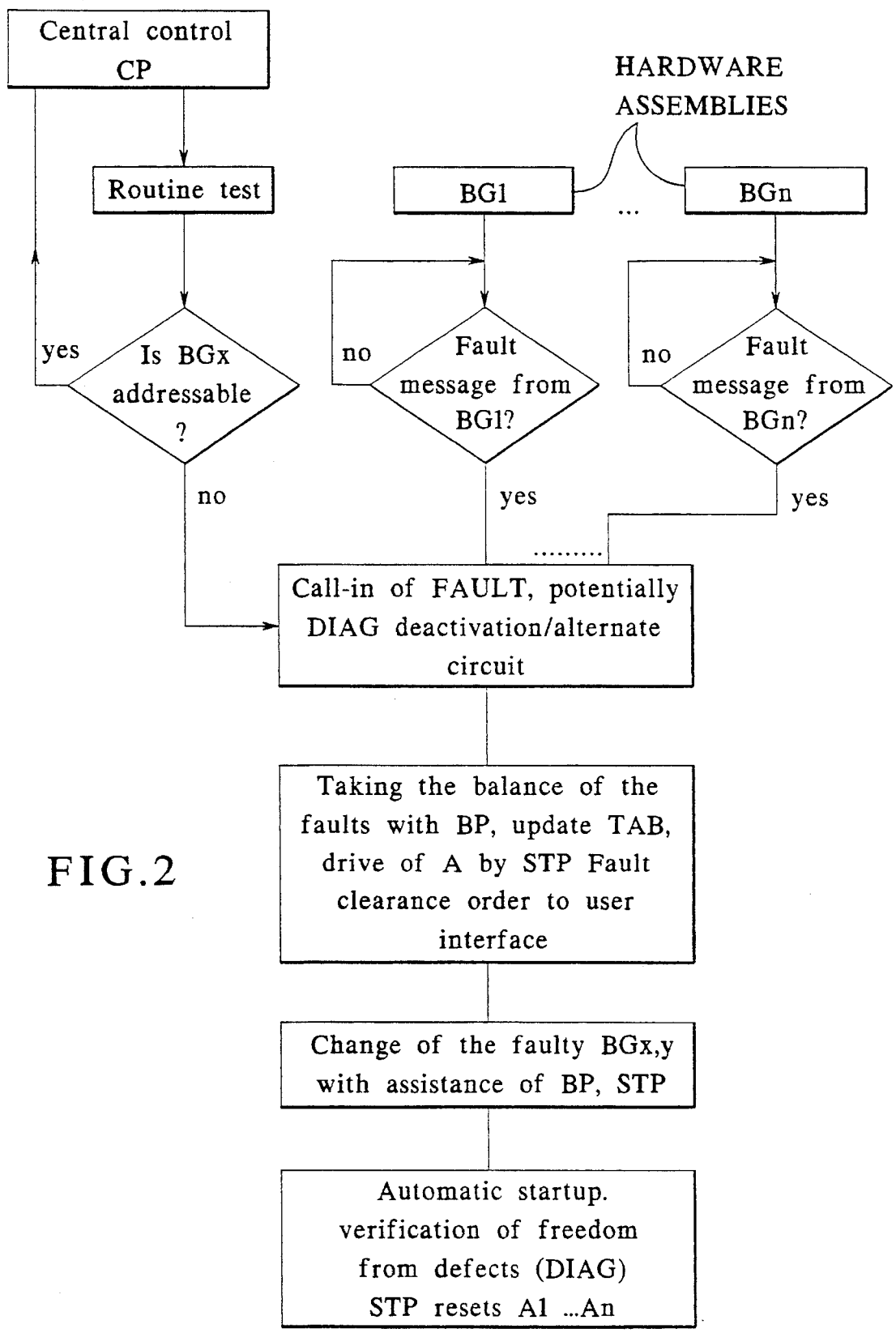
FIG. 2 is a flowchart of the method of the present invention.

It is assumed below according to FIG. 2 that at least one of the assemblies BG1 . . . BGn exhibits only a partial malfunction and is thus still able to send a fault message to the central control means CP. In this case, the fault table TAB is immediately updated and the fault treatment procedure FAULT is started. As a rule, the fault can thus be verified and can be isolated to at least one group of assemblies or to the assembly itself. When the nature and location of the fault that has occurred can be identified via the fault treatment procedure FAULT, the fault table TAB is updated with this information. Since, however, the malfunction cannot be analyzed and localized in every case, it can occur that the fault treatment procedure FAULT only outputs an imprecise fault message to the operator interface. In this case, a diagnostic procedure DIAG can then be started via the operator interface. The nature and isolation of the malfunction that has occurred can therefore be determined. Different fault recognition procedures FAULT and diagnostic procedures DIAG are present in the communication system.

After the end of the fault verification/fault localization procedures, an evaluation procedure BP is started by the system. The balance of the faults deposited in the fault table TAB is analyzed here and they are weighted in terms of their urgency. To that end, the degree of redundancy of the malfunctioning assembly is identified by the evaluation procedure BP in a maintenance handbook WH stored in the central control means CP. When an assembly redundantly designed for the malfunctioning assembly is not present, then the optical display means A1, . . . An of the respective assembly BG1 . . . BGN is suppressed. This indicates to the fault-clearance personnel on site that a replacement is not possible due to the lacking degree of redundancy. The fault-clearance personnel must then potentially take the respective assembly BG1 . . . BGn out of service step-by-step via the operator interface ("Thin out" traffic). In case, however, the degree of redundancy of the malfunctioning assembly BG1 . . . BGn is greater than one, a control procedure STP is activated which drives the respective optical display means A1, . . . An. Since the respective assembly in the present case has transmitted a fault message to the central control means CP, this means that the respective assembly can still be addressed. This can mean that sub-modules S1 . . . Sk attached on the assembly are at least still partially intact. In this case, the central control means CP implements an alternative circuit of the malfunctioning sub-modules onto sub-modules of the redundant assemblies.

It is now assumed that a redundant assembly BG1 . . . BGn also becomes completely malfunctioning during the fault clearance procedure. In this case, the evaluation procedure BP sees to it that the display means of the assembly BG1 . . . BGn that first malfunctioned is in turn canceled and the optical display means A1, . . . An of the assembly that malfunctioned more recently is subsequently driven. This indicates to the fault-clearance personnel that this assembly must be replaced first. An automatic return to service is implemented after the replacement and the diagnostic procedure DIAG is automatically started in order to verify that this assembly is free of malfunction. Given a successful return to service, the control procedure STP is initiated by the evaluation procedure BP that implements logical operations to in turn cancel the drive of the optical display means A1, . . . An of this assembly and, at the same time, to again drive the optical display means A1, . . . An of the assembly that originally malfunctioned. What this means for the fault clearance personnel is that this assembly is now to be replaced.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for system-prompted fault clearance of equipment in a communication system having a central control means in which sequence at least one fault treatment procedure and at least one diagnostic procedure, and having hardware equipment including assemblies each having a respective control means, a respective timer controlled by said respective control means and a plurality of sub-modules located in a respective hardware equipment, the hardware equipment being interrogated by the fault treatment procedure or the diagnostic procedure sequencing in the central control means for verification of operating condition thereof, comprising the steps of:

given an occurrence of a malfunction on at least one of the hardware equipment, transmitting via the respective control means a fault message to the central control means, whereupon the central control means, without substantial interruption of operation of the communication system, executes a fault verification/fault location procedure in which the central control means, first, updates a current fault picture of all hardware equipment present in the communication system that is stored in a fault table, the current fault picture being updated with information obtained from the fault verification/fault location procedure, and, second, sends an alarm message to an operator location;

identifying, via the central control means, without substantial interruption of operation of the communication system, that utilizes the information obtained, maintenance parameters, stored in the central control means via an evaluation procedure sequencing in the central control means, that indicate a current degree of redundancy of hardware equipment associated with said malfunction, and comparing the identified maintenance parameters with parameters representative of the current fault picture;

in response to the comparison of the identified parameters indicating availability of redundant hardware equipment, initiating a control procedure in the central control means, without substantial interruption of operation of the communication system, with which an optical display means is driven on the hardware equipment associated with said malfunction, to thereby indicate that replacement of the hardware equipment associated with said malfunction is both permitted and required; and after replacement by an operator of the hardware equipment, associated with said malfunction, with a redundant hardware equipment and after automatically placing the redundant hardware equipment in service by the central control means, implementing, via the central control means, without substantial interruption of operation of the communication system, an automatic verification of freedom from malfunction and updating, via the central control means, without substantial interruption of operation of the communication system, the optical display means associated with the hardware equipment that had said malfunction.

2. The method according to claim 1, wherein when a malfunction of hardware equipment has occurred such that the respective control means cannot forward a fault message, the respective timer controlled by this respective control means drives the respective optical display means when time runs out on the respective timer and wherein the malfunction of the hardware equipment is recognized by the central control means at least on the basis of a routine test cyclically installed by said control means for updating a fault picture for the communication system.

3. The method according to claim 1, wherein when the automatic verification implemented by the central control means shows that a respective hardware equipment is only partially malfunctioning, indicating that the respective hardware equipment still has at least one operational sub-module, a change from a malfunctioning sub-module of the respective hardware equipment to said at least one operational sub-module of the respective hardware equipment ensues, and wherein a display means of the respective hardware equipment, that is only partially malfunctioning, is driven dependent on there still being adequate redundancy for the change to the at least one operational sub-module of the respective hardware equipment that is only partially malfunctioning.

4. The method according to claim 1, wherein when a plurality of malfunctioning hardware equipment are to be replaced in a predetermined sequence, a respective optical display means of a hardware equipment to be subsequently replaced is only driven when all hardware equipment to be previously replaced have already been successfully replaced.

5. The method according to claim 1, wherein all outage and reavailability messages of the communication system obtained directly and by routine monitoring by the central control means are combined in a global total fault picture that is current at all times and are prioritized by the central control means according to a procedure prescribed for fault clearance of the communication system, whereupon drives of the optical display means of the malfunctioning equipment are updated which, first, can be addressed from a system side and, second, can be immediately fault-cleared without additional activities by an operator and fault clearance personnel.

6. The method according to claim 1, wherein when the information obtained from the fault verification/fault location procedure is imprecise, at least one diagnostic procedure is executed by the central control means to thereby identify and activate the optical display means associated with the hardware equipment that had said malfunction.

7. The method according claim 1, wherein optical display means for hardware equipment, that are only partially malfunctioning and which have no redundancy, are driven only after predetermined operator activities have been performed.

8. The method according to claim 1, wherein the optical display means associated with the hardware equipment that had said malfunction is deactivated, by the central control means, after elimination of the malfunction on the hardware equipment associated with said malfunction.

9. The method according to claim 1, wherein the optical display means is provided by means of assembly plugs for individually replaceable elements of equipment and for transmission systems between system components of the communication system.

10. A method for system-prompted fault clearance of equipment in a communication system having a central control means in which sequence at least one fault treatment procedure and at least one diagnostic procedure, and having hardware equipment including assemblies each having a respective control means, a respective timer controlled by said respective control means and a plurality of sub-modules located in a respective hardware equipment, the hardware equipment being interrogated by the fault treatment procedure or the diagnostic procedure sequencing in the central control means for verification of operating condition thereof, comprising the steps of:

given an occurrence of a malfunction on at least one of the hardware equipment, transmitting via the respective control means a fault message to the central control means, whereupon the central control means, without substantial interruption of operation of the communication system, executes a fault verification/fault location procedure in which the central control means, first, updates a current fault picture of all hardware equipment present in the communication system that is stored in a fault table, the current fault picture being updated with information obtained from the fault verification/fault location procedure, and, second, sends an alarm message to an operator location, or when a malfunction of the respective hardware equipment has occurred such that the respective control means cannot forward a fault message, the respective timer controlled by this respective control means drives the respective optical display means when time runs out on the respective timer, the malfunction of the hardware equipment being recognized by the central control means at least on the basis of a routine test cyclically installed by said control means for updating a fault picture for the communication system;

identifying, via the central control means, without substantial interruption of operation of the communication system, that utilizes the information obtained, maintenance parameters, stored in the central control means via an evaluation procedure sequencing in the central control means, that indicate a current degree of redundancy of hardware equipment associated with said malfunction, and comparing the identified maintenance parameters with parameters representative of the current fault picture;

in response to the comparison of the identified parameters indicating availability of redundant: hardware equipment, initiating a control procedure in the central control means, without substantial interruption of operation of the communication system, with which an optical display means is driven on the hardware equipment associated with said malfunction, to thereby indicate that replacement of the hardware equipment associated with said malfunction is both permitted and required; and after replacement by an operator of the hardware equipment, associated with said malfunction, with a redundant hardware equipment and after automatically placing the redundant hardware equipment in service by the central control means, implementing, via the central control means, without substantial interruption of operation of the communication system, an automatic verification of freedom from malfunction and updating, via the central control means, without substantial interruption of operation of the communication system, the optical display means associated with the hardware equipment that had said malfunction.

11. The method according to claim 10, wherein when the automatic verification implemented by the central control means shows that a respective hardware equipment is only partially malfunctioning, indicating that the respective hardware equipment still has at least one operational sub-module, a change from a malfunctioning sub-module of the respective hardware equipment to said at least one operational sub-module of the respective hardware equipment ensues, and wherein a display means of the respective hardware equipment, that is only partially malfunctioning, is driven dependent on there still being adequate redundancy for the change to the at least one operational sub-module of the respective hardware equipment that is only partially malfunctioning.

12. The method according to claim 10, wherein when a plurality of malfunctioning hardware equipment are to be replaced in a predetermined sequence, a respective optical display means of a hardware equipment to be subsequently replaced is only driven when all hardware equipment to be previously replaced have already been successfully replaced.

13. The method according to claim 10, wherein all outage and reavailability messages of the communication system obtained directly and by routine monitoring by the central control means are combined in a global total fault picture that is current at all times and are prioritized by the central control means according to a procedure prescribed for fault clearance of the communication system, whereupon drives of the optical display means of the malfunctioning equipment are updated which, first, can be addressed from a system side and, second, can be immediately fault-cleared without additional activities by an operator and fault clearance personnel.

14. The method according to claim 10, wherein when the information obtained from the fault verification/fault location procedure is imprecise, at least one diagnostic procedure is executed by the central control means to thereby identify and activate optical display means associated with the hardware equipment that had said malfunction.

15. A method for system-prompted fault clearance of equipment in a communication system having a central control means in which sequence at least one fault treatment procedure and at least one diagnostic procedure, and having hardware equipment including assemblies each having a respective control means, a respective timer controlled by said respective control means and a plurality of sub-modules located in a respective hardware equipment, the hardware equipment being interrogated by the fault treatment procedure or the diagnostic procedure sequencing in the central control means for verification of operating condition thereof, comprising the steps of:

given an occurrence of a malfunction on at least one of the hardware equipment, transmitting via the respective control means a fault message to the central control means, whereupon the central control means, without substantial interruption of operation of the communication system, executes a fault verification/fault location procedure in which the ,central control means, first, updates a current fault picture of all hardware equipment present in the communication system that is stored in a fault table, the current fault picture being updated with information obtained from the fault verification/fault location procedure, and, second, sends an alarm message to an operator location and when the automatic verification implemented by the central control means shows that a respective hardware equipment is only partially malfunctioning, indicating that the respective hardware equipment still has at least one operational sub-module, a change from a malfunctioning sub-module of the respective hardware equipment to said at least one operational sub-module of the respective hardware equipment ensues, an optical display means of the respective hardware equipment, that is only partially malfunctioning, being driven dependent on there still being adequate redundancy for the change to the at least one operational sub-module of the respective hardware equipment that is only partially malfunctioning;

identifying, via the central control means, without substantial interruption of operation of the communication system, that utilizes the information obtained, maintenance parameters, stored in the central control means via an evaluation procedure sequencing in the central control means, that indicate a current degree of redundancy of hardware equipment associated with said malfunction, and comparing the identified maintenance parameters with parameters representative of the current fault picture;

in response to the comparison of the identified parameters indicating availability of redundant hardware equipment, initiating a control procedure in the central control means, without substantial interruption of operation of the communication system, with which an optical display means is driven on the hardware equipment associated with said malfunction, to thereby indicate that replacement of the hardware equipment associated with said malfunction is both permitted and required; and after replacement by an operator of the hardware equipment, associated with said malfunction, with a redundant hardware equipment and after automatically placing the redundant hardware equipment in service by the central control means, implementing, via the central control means, without substantial interruption of operation of the communication system, an automatic verification of freedom from malfunction and updating, via the central control means, without substantial interruption of operation of the communication system, the optical display means associated with the hardware equipment that had said malfunction.

16. The method according to claim 15, wherein when a plurality of malfunctioning hardware equipment are to be replaced in a predetermined sequence, a respective optical display means of a hardware equipment to be subsequently replaced is only driven when all hardware equipment to be previously replaced have already been successfully replaced.

17. The method according to claim 15, wherein all outage and reavailability messages of the communication system obtained directly and by routine monitoring by the central control means are combined in a global total fault picture that is current at all times and are prioritized by the central control means according to a procedure prescribed for fault clearance of the communication system, whereupon drives of the optical display means of the malfunctioning equipment are updated which, first, can be addressed from a system side and, second, can be immediately fault-cleared without additional activities by an operator and fault clearance personnel.

18. The method according to claim 15, wherein when the information obtained from the fault verification/fault location procedure is imprecise, at least one diagnostic procedure is executed by the central control means to thereby identify and activate the optical display means associated with the hardware equipment that had said malfunction.

* * * * *